United States Patent
Atarashi et al.

(10) Patent No.: US 8,895,644 B2
(45) Date of Patent: *Nov. 25, 2014

(54) RESIN COMPOSITION AND LIGHTING FIXTURE COMPONENTS MADE OF THE SAME

(75) Inventors: Kenji Atarashi, Ichihara (JP); Hisakatsu Hama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,236

(22) Filed: Mar. 8, 2012

(65) Prior Publication Data

US 2012/0238674 A1    Sep. 20, 2012

(30) Foreign Application Priority Data

Mar. 15, 2011  (JP) ................. 2011-056202
Oct. 20, 2011  (JP) ................. 2011-230471
Oct. 20, 2011  (JP) ................. 2011-230472

(51) Int. Cl.
| | |
|---|---|
| *C08L 5/00* | (2006.01) |
| *C08K 5/524* | (2006.01) |
| *C08K 5/105* | (2006.01) |
| *C08K 5/526* | (2006.01) |
| *C08K 3/04* | (2006.01) |
| *C08L 23/12* | (2006.01) |
| *C08L 23/08* | (2006.01) |
| *C08K 7/06* | (2006.01) |
| *C08K 5/151* | (2006.01) |
| *C08K 3/22* | (2006.01) |

(52) U.S. Cl.
CPC ............ *C08L 23/12* (2013.01); *C08L 23/0815* (2013.01); *C08K 3/04* (2013.01); *C08K 7/06* (2013.01); *C08K 5/151* (2013.01); *C08L 2666/24* (2013.01); *C08K 3/22* (2013.01); *C08K 2003/2206* (2013.01)
USPC .............. 524/56; 524/58; 524/152; 524/291; 524/496

(58) Field of Classification Search
USPC .......................... 524/496, 56, 152
See application file for complete search history.

(56) References Cited

U.S. PATENT DOCUMENTS

| | | | | |
|---|---|---|---|---|
| 5,001,176 A | * | 3/1991 | Nakazima | 524/48 |
| 2008/0242793 A1 | * | 10/2008 | Yano | 524/496 |
| 2012/0238687 A1 | * | 9/2012 | Atarashi | 524/496 |

FOREIGN PATENT DOCUMENTS

| | | |
|---|---|---|
| JP | 08283456 A | 10/1996 |
| JP | 10-036578 A | 2/1998 |
| JP | 11-263863 A | 9/1999 |
| JP | 11-323071 A | 11/1999 |
| JP | 2007-182551 A | 7/2007 |
| JP | 2008-150595 A | 7/2008 |

OTHER PUBLICATIONS

Mitsubishi Plastics—Dialead Pitch-based Carbon Fiber—http://www.mpi.co.jp/english/products/industrial_materials/pitch_based_carbon_fiber/pbcf001.html.*

* cited by examiner

*Primary Examiner* — Ling Choi
*Assistant Examiner* — Ronald Grinsted
(74) *Attorney, Agent, or Firm* — Panitch Schwarze Belisario & Nadel LLP

(57) ABSTRACT

Disclosed is a resin composition including a thermoplastic resin (A), carbon fibers (B), graphite particles (C), an absorbent (D) selected from the group consisting of calcium hydroxide, zeolite, and hydrotalcite, and an antioxidant (E) or a combination of an antioxidant (E) and a compound (F) selected from a compound group consisting of compounds represented by $C_nH_{n+2}(OH)_n$ wherein n represents an integer of 4 or greater, alkoxy forms derived from compounds represented by the following formula (2), trehalose, sucrose, lactose, maltose, melicitose, stachyose, curdlan, glycogen, glucose, and fructose. A lighting fixture component made of this resin composition is also disclosed.

(2)

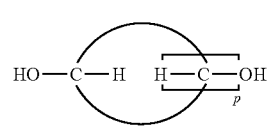

7 Claims, No Drawings

RESIN COMPOSITION AND LIGHTING FIXTURE COMPONENTS MADE OF THE SAME

BACKGROUND OF THE INVENTION

1. Field of the Invention

The present invention relates to a resin composition and lighting fixture components made of the same.

2. Description of Related Art

Heat sinks made of an aluminum-based alloy high in heat conductivity or the like have heretofore been used as heat radiating parts of LED elements to be used for LED lighting fixtures. In recent years, in order to afford heat radiating parts which are easy to fabricate and lighter, replacement of aluminum-based alloys by resins have been studied.

For example, patent document 1 discloses a thermoplastic elastomer composition comprising an olefin-based resin, an ethylene-α-olefin-based copolymer rubber, and an additive for resin, the additive having a prescribed loss on heating and a prescribed melting point. Patent document 2 discloses a polyolefin-based resin foamed article containing carbon black and so on.

RELATED ART DOCUMENTS

Patent Documents

[Patent Document 1] JP 10-36578 A
[Patent Document 2] JP 11-263863 A

Problems to be Solved by the Invention

However, in use for components that are exposed to high temperature like lighting fixture components, neither the resin composition disclosed in patent document 1 nor the foamed article disclosed in patent document 2 is satisfactory in anti-fogging performance or heat conductivity. The anti-fogging property as referred to herein is a property that volatile components released from an object used as a lighting fixture component are prevented from attaching to and fogging glass of the lighting fixture.

In light of the above-described problem, the object of the present invention is to provide a resin composition from which molded articles with good heat conductivity and good anti-fogging property, and a lighting fixture component made thereof.

SUMMARY OF THE INVENTION

The present invention provides a resin composition comprising from 40% by mass to 65% by mass of a thermoplastic resin (A), from 5% by mass to 10% by mass of carbon fibers (B), and from 30% by mass to 50% by mass of graphite particles (C) where the total amount of the (A), the (B), and the (C) shall be 100% by mass, and where the sum total of the masses of the (A), the (B), and the (C) is defined to be 100 parts by mass, the composition further comprising, relative to 100 parts by mass:

more than 0.05 parts by mass and not more than 1 part by mass of an absorbent (D) selected from the group consisting of calcium hydroxide, zeolite, and hydrotalcite, and from 0.3 parts by mass to 1 part by mass of an antioxidant (E), or a combination of from 0.05 parts by mass to 1 part by mass of an antioxidant (E) and from 0.01 parts by mass to 1 part by mass of at least one compound (F) selected from the following compound group S:

compound group S: a group consisting of compounds represented by a formula: $C_nH_{n+2}(OH)_n$ wherein n represents an integer of 4 or greater, alkoxy forms defined below, compounds represented by the following formula (2), trehalose, sucrose, lactose, maltose, melicitose, stachyose, curdlan, glycogen, glucose, and fructose;

wherein the alkoxy forms are compounds each derived from a compound of the following formula (1) by replacing the hydrogen atom of at least one hydroxy group selected from among the hydroxy groups of the compound by an alkyl group having from 1 to 12 carbon atoms:

$$C_mH_{2m}O_m \quad (1)$$

wherein m is an integer of 3 or greater and the compound of formula (1) has one aldehyde group or ketone group and m−1 hydroxyl groups;

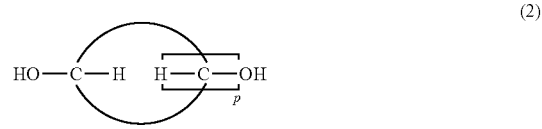

(2)

wherein p is an integer of 2 or greater. The present invention provides a lighting fixture component made of this resin composition.

The combination of the carbon fiber's (B) and the graphite particles (C) effectively contributes mainly to improvement in heat conductivity, whereas the absorbent (D), the antioxidant (E), and the compound (F) contribute mainly to improvement in anti-fogging property. The combination of the prescribed amounts of components (A) through (E) or the prescribed amounts of components (A) through (F) attains the desired object.

According to the present invention, it is possible to obtain a resin composition from which molded articles with good heat conductivity and good anti-fogging property can be obtained, and a lighting fixture component made of this resin composition.

DESCRIPTION OF THE PREFERRED EMBODIMENTS

The resin composition according to the present invention heat releasable resin composition comprises a thermoplastic resin (A), carbon fibers (B), and graphite particles (C), an absorbent (D), and an antioxidant (E). A detailed description is made below.

[Resin Composition]

<Thermoplastic Resin (A)>

The thermoplastic resin (A) contained in the resin composition is preferably a thermoplastic resin that can be fabricated at temperatures of from 200° C. to 450° C. Specific examples of thermoplastic resins preferred for the present invention include polyolefin, polystyrene, polyamide, vinyl halide resins, polyacetal, polyester, polycarbonate, polyarylsulfone, polyaryl ketone, polyphenylene ether, polyphenylene sulfide, polyaryl ether ketone, polyethersulfone, polyphenylene sulfide sulfone, polyarylate, liquid crystal polyester, and fluororesin. These may be used singly or two or more of them may be used in combination.

Among these, use of polyolefin or polystyrene is preferred from the viewpoint of molding processability. whereby molding processability in fabricating electric/electronic parts of relatively complicated shapes becomes good.

Examples of a polyolefin resin to be used preferably in the present invention include polypropylene, polyethylene, and α-olefin resins composed mainly of an α-olefin having 4 or more carbon atoms. These may be used singly or two or more of them may be used in combination.

Examples of the polypropylene include propylene homopolymers, propylene-ethylene random copolymers, and propylene-ethylene block copolymers obtainable by homopolymerizing propylene and then copolymerizing ethylene and propylene.

Examples of the polyethylene resin include ethylene homopolymers, and ethylene-α-olefin random copolymers, which are copolymers of ethylene with an α-olefin having 4 or more carbon atoms.

Examples of the α-olefin resins include α-olefin-propylene random copolymers.

Examples of the α-olefin having 4 or more carbon atoms to be used for polyolefin include 1-butene, 2-methyl-1-propene, 2-methyl-1-butene, 3-methyl-1-butene, 1-hexene, 2-ethyl-1-butene, 2,3-dimethyl-1-butene, 1-pentene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. 1-Butene, 1-pentene, 1-hexene and 1-octene are preferred.

Examples of the method for polymerizing an olefin include bulk polymerization, solution polymerization, slurry polymerization, and vapor phase polymerization. The bulk polymerization is a method in which polymerization is carried out using, as a medium, an olefin that is liquid at the polymerization temperature, and the solution polymerization or the slurry polymerization is a method in which polymerization is carried out in an inert hydrocarbon solvent such as propane, butane, isobutane, pentane, hexane, heptane, and octane. The gas phase polymerization is a method in which a gaseous monomer is used as a medium and a gaseous monomer is polymerized in the medium.

Such polymerization methods may be conducted either in a batch system or in a continuous system and also may be conducted either in a single stage system using one polymerization reactor or in a multistage system using a polymerization apparatus composed of a plurality of polymerization reactors linked in series and these polymerization methods may be combined appropriately. From the industrial and economical point of view, a continuous vapor phase polymerization method or a bulk-vapor phase polymerization method in which a bulk polymerization method and a vapor phase polymerization method are used continuously is preferred.

The conditions in the polymerization step (e.g., polymerization temperature, polymerization pressure, monomer concentration, input amount of catalyst, and polymerization time) may be determined appropriately.

Examples of the catalyst to be used for the production of the polyolefin include multisite catalysts and single site catalysts. Examples of preferable multisite catalysts include catalysts which are obtained by use of a solid catalyst component comprising a titanium atom, a magnesium atom and a halogen atom, and examples of preferable single site catalysts include metallocene catalysts.

In the case that the polyolefin to be used in the present invention is a polypropylene, examples of preferable catalysts to be used for the method for producing the polypropylene include a catalyst that is obtained by using the aforementioned solid catalyst component comprising a titanium atom, a magnesium atom, and a halogen atom.

The propylene homopolymer and the propylene homopolymer portion (i.e., the portion formed by homopolymerization of propylene) of the propylene-ethylene block copolymer preferably has an isotactic pentad fraction, measured by $^{13}$C-NMR, of not less than 0.95, and more preferably not less than 0.98.

The isotactic pentad fraction is the molar fraction of propylene monomer units located at the centers of isotactic sequences in pentad units in a propylene polymer molecule chain, in other words, the fraction of propylene monomer units located in sequences in which five successively meso-bonded propylene monomer units (hereinafter represented by mmmm). The method for measuring the isotactic pentad fraction is the method disclosed by A. Zambelli et al. in Macromolecules 6, 925 (1973), namely, a method in which the measurement is performed by using $^{13}$C-NMR.

Specifically, the isotactic pentad fraction is a ratio of the area of the peak assigned to the mmmm to the total peak area in the methyl carbon ranges observed in a $^{13}$C-NMR spectrum.

From the viewpoint of the balance between the injection moldability and the heat conductivity of the resin composition, the melt flow rate (MFR) of the thermoplastic resin (A) is preferably from 0.5 g/10 minutes to 30 g/10 minutes, more preferably from 0.5 g/10 minutes to 25 g/10 minutes, and even more preferably from 1 g/10 minutes to 15 g/10 minutes. The measurement was conducted at a temperature of 230° C. under a load of 2.16 kg. The measurement of the melt flow rate (MFR) in the present invention is carried out in accordance with the method provided in JIS K7210.

From the viewpoint of the balance between the flowability and the heat conductivity of the resin composition, the content of the thermoplastic resin (A) in the present invention is from 40% by mass to 65% by mass, and preferably from 45% by mass to 55% by mass.

<Carbon Fibers (B)>

The carbon fibers (B) to be used in the present invention are preferably a pitch-based carbon fibers having a heat conductivity exceeding. 100 W/mK. Specific examples thereof include DIALEAD (registered trademark) produced by Mitsubishi Plastics, Inc. and Raheama (registered trademark) produced by Teijin, Ltd.

The surface of the carbon fibers (B) may have been treated with a converging agent. Examples of the converging agent include polyolefin, polyurethane, polyester, acrylic resins, epoxy resins, starch, and vegetable oil. In the converging agent may have been blended a surfacing agent, such as an acid-modified polyolefin and a silane-based coupling agent, or a lubricant, such as paraffin wax.

Examples of the method for treating the carbon fibers (B) with a converging agent include a method in which the fibers are immersed in an aqueous solution in which the converging agent has been dissolved and a method in which the aqueous solution is applied to the fibers with a spray.

The number average fiber length of the carbon fibers (B) in the resin composition in the present invention is preferably 0.5 mm or more, and more preferably 0.7 mm or more. Adjustment of the fiber length to within such a range can increase the heat conductivity. The number average fiber length (unit: mm) of carbon fibers can measured by remove resin from a sample for evaluation by a Soxhlet extraction method (solvent: xylene) to collect fibers and then carrying out measurement by the method disclosed in JP 2002-5924 A.

The diameter of the carbon fibers (B) is preferably 5 mm or more.

The content of the carbon fibers (B) is from 5% by mass to 10% by mass and preferably from 7% by mass to 9% by mass. By adjusting the content of the carbon fibers to 5% by mass or more, it becomes possible to improve the heat conductivity of a molded article to be obtained, and by adjusting the content to 10% by mass or less, it is possible to obtain a sufficient heat conductivity while reducing the content of the carbon fibers (B).

<Graphite Particles (C)>

Graphite that constitutes the graphite particles (C) to be used in the present invention may be either of artificial graphite or of natural graphite. Specific examples include CB-150 (trademark) produced by Nippon Graphite Industries, Co., Ltd.

The average particle diameter of the graphite particles (C) is preferably greater than 12 μm and up to 50 μm, and more preferably from 19 μm to 40 μm. By adjusting the average particle diameter to be larger than 12 μm, it becomes possible to adjust the flowability of the resin composition into an appropriated range and make molding processability good.

The average particle diameter can be measured by using a laser scattering particle size distribution analyzer.

The content of the graphite particles (C) is from 30% by mass to 50% by mass and preferably from 35% by mass to 45% by mass. By adjusting the content of the graphite particles (C) to 30% by mass or more, it becomes possible to improve the sufficient heat conductivity of a molded article to be obtained, and by adjusting the content to 50% by mass or less, it is possible to obtain a resin composition with good molding processability.

<Absorbent (D)>

The absorbent (D) to be used in the present invention is at least one compound selected from the group consisting of calcium hydroxide, zeolite, and hydrotalcite. Among these, use of calcium hydroxide is preferred because a small amount thereof can improve anti-fogging property.

The average particle diameter of calcium hydroxide is preferably from 0.1 μm to 150 μm and more preferably from 1 μm to 10 μm. By adjusting the average particle diameter into this range, it is possible to disperse calcium hydroxide in the thermoplastic resin more uniformly. The average particle diameter can be measured by using a laser scattering particle size distribution analyzer.

From the viewpoint of to obtain a molded article with good anti-fogging property, the content of the absorbent (D) is more than 0.05 parts by mass and not more than 1 part by mass and preferably from 0.2 parts by mass to 1 part by mass relative to 100 parts by mass of the thermoplastic resin (A), the carbon fibers (B) and the graphite particles (C) in total.

The resin composition of the present invention comprises, in one embodiment, an antioxidant (E) described below in addition to the above-described thermoplastic resin (A), carbon fibers (B), graphite particles (C) and absorbent (D), which embodiment is hereinafter referred to as first embodiment. The resin composition of the present invention comprises, in another embodiment, both an antioxidant (E) and a compound (F) described below in addition to the components (A) through (D), which embodiment is hereinafter referred to as second embodiment.

<Antioxidant (E)>

Antioxidants are compounds that have an activity to prevent decomposition of thermoplastic resin caused by heat, light, oxygen, and the like, and conventional antioxidants can be used as the antioxidant (E) to be used in the present invention. Examples of such antioxidants include phenolic antioxidants, hydroquinone-based antioxidants, sulfur-containing antioxidants, and phosphorus-containing antioxidants. These may be used either singly or in combination and it is preferred to use a phenolic antioxidant or a phosphorus-containing antioxidant solely or both in combination.

Examples of the phenolic antioxidant include alkylated monophenols, alkylthiomethylphenols, alkylidenebisphenols and their derivatives, acylaminophenol derivatives, β-(3,5-di-tert-butyl-4-hydroxyphenyl)propionic acid esters, hydroxylated thiodiphenyl ether, benzyl derivatives, triazine derivatives, hydroxybenzyl malonate derivatives, aromatic hydroxybenzyl derivatives, benzyl phosphonate derivatives, β-(5-tert-butyl-4-hydroxy-3-methylphenyl)propionic acid esters, β-(3,5-dicyclohexyl-4-hydroxyphenyl)propionic acid esters, 3,5-di-tert-butyl-4-hydroxyphenylacetic acid esters, β-(3,5-di-tert-butyl-4-hydroxyphenyl)propionic acid, tocopherols, and tetrakis[methylene-3(3',5'-di-tert-butyl-4-hydroxyphenyl)-propionate]methane.

Examples of the alkylated monophenols include pentaerythritol tetrakis[3-(3,5-di-tert-butyl-4-hydroxyphenyl) propionate], n-octadecyl-β-(4'-hydroxy-3',5'-di-tert-butylphenyl) propionate, 3,9-bis[1,1-dimethyl-2-[β-(3-tert-butyl-4-hydroxy-5-methyl-phenyl)propionyloxy]ethyl]-2,4,8,10-tetraoxaspiro[5,5]-undecane, 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, 2,6-di-tert-butyl-4-methylphenol, 2,4,6-tri-tert-butylphenol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl 4-methyl phenol, 2-(α-methylcyclohexyl)-4,6-dimethylphenol, 2,6-dioctadecyl-4-methyl phenol, 2,4,6-tricyclohexylphenol, 2,6-di-tert-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, and 2,4-dimethyl-6-(1'-methyltridecyl-1'-yl)phenol.

Examples of the alkylthiomethylphenols include 2,4-dioctylthiomethyl-6-tert-butylphenol, 2,4-dioctyl thiomethyl-6-methylphenol, 2,4-dioctylthiomethyl-6-ethylphenol, and 2,6-didodecylthiomethyl-4-nonyl phenol.

Examples of the alkylidenebisphenols and their derivatives include 2,2'-methylenebis(4-methyl-6-tert-butylphenol), 2,2'-methylenebis(4-ethyl-6-tert-butylphenol), 2,2'-methylenebis[(4-methyl-6-(α-methylcyclohexyl)phenol]) 1,2,2'-methylenebis(4-methyl-6-cyclohexylphenol), 2,2'-methylenebis(4-methyl-6-nonyl phenol), 2,2'-methylenebis(4,6-di-tert-butylphenol), 2,2'-ethylidenebis(4,6-di-tert-butylphenol), 2,2'-ethylidenebis(4-isobutyl-6-tert-butylphenol), 2,2'-methylenebis[(6-(α-methylbenzyl)-4-nonylphenol)], 2,2'-methylenebis[(6-(α,α-dimethylbenzyl)-4-nonylphenol)], 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 2,6-bis(3-tert-butyl-5-methyl-2-hydroxybenzyl)-4-methyl-phenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis-3'-tert-butyl-4'-hydroxyphenyl]butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl) butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane, and 1,1,5,5-tetra(5-tert-butyl-4-hydroxy-2-methylphenyl)pentane.

Examples of the acylaminophenol derivatives include 4-hydroxylauranilide, 4-hydroxystearanilide, and octyl N-(3,5-di-tert-butyl-4-hydroxyphenyl)carbamate.

Examples of the β-(3,5-di-tert-butyl-4-hydroxyphenyl) propionic acid esters include esters made from 3-(3,5-di-tert-butyl-4-hydroxyphenyl)propionic acid and an alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane.

Examples of the hydroxylated thiodiphenyl ethers include 2,2'-thiobis(6-tert-butylphenol), 2,2'-thiobis(4-methyl-6-tert-butylphenol), 2,2'-thiobis(4-octylphenol), 4,4'-thiobis(2-methyl-6-tert-butylphenol), and 4,4'-(2,6-dimethyl-4-hydroxyphenyl)disulfide.

Examples of the benzyl derivatives include 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate, and mixtures thereof.

Examples of the triazine derivatives include 2,4-bis(n-octylthio)-6-(4-hydroxy-3,5-di-tert-butylanilino)-1,3,5-triazine, 2-n-octylthio-4,6-bis(4-hydroxy-3,5-di-tert-butylanilino)-1,3,5-triazine, 2-n-octylthio-4,6-bis(4-hydroxy-3,5-di-tert-butylphenoxy)-1,3,5-triazine, 2,4,6-tris(3,5-di-tert-butyl-4-phenoxy)-1,3,5-triazine, tris(4-tert-butyl-3-hydroxy-2,6-dimethylbenzyl)isocyanurate, tris(3,5-di-tert-butyl-4-hydroxybenzyl)isocyanurate, 2,4,6-tris(3,5-di-tert-butyl-4-hydroxyphenylethyl)-1,3,5-triazine, 2,4,6-tris(3,5-di-tert-butyl-4-hydroxyphenylpropyl)-1,3,5-triazine, tris(3,5-dicyclohexyl-4-hydroxybenzyl) isocyanurate, and tris[2-(3',5'-di-tert-butyl-4'-hydroxycinnamoyloxy)ethyl]isocyanurate.

Examples of the hydroxybenzyl malonate derivatives include dioctadecyl-2,2-bis(3,5-di-tert-butyl-2-hydroxybenzyl)malonate, dioctadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, and bis[4-(1,1,3,3-tetramethylbutyl)phenyl]-2,2-bis(3,5-di-tert-butyl-4-hydroxybenzyl)malonate.

Examples of the aromatic hydroxybenzyl derivatives include 1,3,5-trimethyl-2,4,6-tris(3,5-di-tert-butyl-4-hydroxy-benzyl)benzene, 1,4-bis(3,5-di-tert-butyl-4-hydroxybenzyl)-2,3,5,6-tetra-methyl benzene, and 2,4,6-tris(3,5-tert-butyl-4-hydroxybenzyl)phenol.

Examples of the benzyl phosphonate derivatives include calcium salts of 3,5-di-tert-butyl-4-hydroxybenzyl phosphonic acid monoesters, dimethyl-3,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, and dioctadecyl-5-tert-butyl-4-hydroxy-3-methylbenzyl phosphonate.

Examples of the β-(5-tert-butyl-4-hydroxy-3-methylphenyl)propionic acid esters include esters made from β-(5-tert-butyl-4-hydroxy-3-methylphenyl)propionic acid and an alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane.

Examples of the β-(3,5-dicyclohexyl-4-hydroxyphenyl) propionic acid esters include esters made from β-(3,5-dicyclohexyl-4-hydroxyphenyl)propionic acid and an alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane.

Examples of the 3,5-di-tert-butyl-4-hydroxyphenylacetic acid esters include esters made from 3,5-di-tert-butyl-4-hydroxyphenylacetic acid and an alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane.

Examples of the β-(3,5-di-tert-butyl-4-hydroxyphenyl) propionic acid amides include N,N'-bis[(3-(3',5'-di-tert-butyl-4'-hydroxyphenyl)-propionyl)]hydrazine, N,N'-bis[(3-(3',5'-di-tert-butyl-4'-hydroxyphenyl)-propionyl)]hexamethylenediamine, and N,N'-bis[(3-(3',5'-di-tert-butyl-4'-hydroxyphenyl)-propionyl)]trimethylenediamine.

Examples of the tocopherols include α-tocopherol, β-tocopherol, γ-tocopherol, and δ-tocopherol.

Examples of the hydroquinone-based antioxidants include hydroquinone, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyphenyl stearate, bis(3,5-di-tert-butyl-4-hydroxyphenyl)adipate, and mixtures thereof.

Examples of the sulfur-containing antioxidants include 2,4-bis[(octylthio)methyl]-O-cresol, 4,6-bis(dodecylthiomethyl)-O-cresol, dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and pentaerythrityl tetrakis(3-laurylthio propionate).

Examples of the phosphorus-containing antioxidants include triphenyl phosphite, tris(nonylphenyl)phosphite, tris(2,4-di-tert-butylphenyl)phosphite, 6-[3-(3-tert-butyl-4-hydroxy-5-methylphenyl)propoxy]-2,4,6,8,10-tetra-tert-butyl-benzo[d,f][1,3,2]dioxaphosphepine, trilauryl phosphite, trioctadecyl phosphite, distearyl pentaerythritol diphosphite, diisodecyl pentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-diphenylene diphosphonite, 2,2'-methylenebis(4,6-di-tert-butylphenyl) 2-ethylhexyl phosphite, 2,2'-ethylidenebis(4,6-di-tert-butylphenyl)fluoro phosphite, bis(2,4-di-tert-butyl-6-methylphenyl)ethyl phosphite, bis(2,4-di-tert-butyl-6-methylphenyl)methyl phosphite, 2-(2,4,6-tritert-butylphenyl)-5-ethyl-5-butyl-1,3,2-oxaphosphorinane, 2,2',2''-nitrilo[triethyl-tris(3,3',5,5'-tetra-tert-butyl-1,1'-biphenyl-2,2'-diyl)phosphite, and 2,4,8,10-tetra-tert-butyl-6-[3-(3-methyl-4-hydroxy-5-tert-butylphenyl)propoxy]dibenzo[d,f][1,3,2]dioxaphosphepin. As to the antioxidant (E), two or more kinds of antioxidants may be used in combination.

In the first embodiment, in which the resin composition of the present invention comprises the antioxidant (E) in addition to the above-described thermoplastic resin (A), carbon fibers (B), graphite particles (C) and absorbent (D), the content of the antioxidant (E) is from 0.3 parts by mass to 1 part by mass and preferably from 0.4 parts by mass to 0.8 parts by mass relative to 100 parts by mass of the thermoplastic resin (A), the carbon fibers (B) and the graphite particles (C) in total. When the content of the antioxidant (E) is 0.3 parts by mass or more, the resin composition is superior in anti-fogging property. When the content is 1 part by mass or less, the resin composition will release little odor.

On the other hand, in the second embodiment, in which the resin composition of the present invention comprises both the antioxidant (E) and a compound (F) described below in addition to the above-described thermoplastic resin (A), carbon fibers (B), graphite particles (C) and absorbent (D), the content of the antioxidant (E) is from 0.05 parts by mass to 1 part by mass, preferably from 0.1 parts by mass to 0.5 parts by mass relative to 100 parts by mass of the thermoplastic resin (A), the carbon fibers (B) and the graphite particles (C) in total.

<At Least One Compound (F) Selected from Compound Group S>

The compound (F) to be used in the present invention is at least one compound selected from the following compound group S.

The compound group S is a compound group consisting of compounds represented by a formula: $C_nH_{n+2}(OH)_n$ wherein n represents an integer of 4 or greater, alkoxy forms defined below, compounds represented by the following formula (2), trehalose, sucrose, lactose, maltose, melicitose, stachyose, curdlan, glycogen, glucose, and fructose.

The alkoxy forms are compounds each derived from a compound of the following formula (1) by replacing the hydrogen atom of at least one hydroxy group selected from among the hydroxy groups of the compound by an alkyl group having from 1 to 12 carbon atoms:

$$C_mH_{2m}O_m \qquad (1)$$

wherein m is an integer of 3 or greater and the compound of formula (1) has one aldehyde group or ketone group and m−1 hydroxyl groups;

(2)

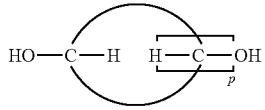

wherein p is an integer of 2 or greater.

As to the compound represented by the formula: $C_nH_{n+2}(OH)_n$ (this compound is hereinafter referred to as compound S1), n appearing in the formula represent an integer of 4 or greater; n is preferably an integer of from 5 to 8, and more preferably 6.

Examples of compound S1 include sugar alcohols having 4 or more carbon atoms. Examples of sugar alcohols of n=4 include erythritol and threitol; examples of sugar alcohols of n=5 include adonitol, arabinitol, and xylitol; examples of sugar alcohols of n=6 include allitol, talitol, sorbitol, mannitol, iditol, and galactitol; examples of sugar alcohols of n=7 include volemitol and perseitol; and examples of sugar alcohols of n=8 include octitol.

Compound S1 may be either a D-form or an L-form or alternatively may be a mixture of D- and L-forms. Moreover, it may also be either optically active or optically inactive.

Preferably, Compound S1 is a sugar alcohol having six carbon atoms.

Alkoxy forms are compounds each derived from a compound of the following formula (1) (this compound may be hereinafter referred to as compound (1)) by replacing the hydrogen atom of at least one hydroxy group selected from among the hydroxy groups of the compound by an alkyl group having from 1 to 12 carbon atoms; compound (1) has one aldehyde group or ketone group and m−1 hydroxyl groups.

$$C_mH_{2m}O_m \qquad (1)$$

m of compound (1) is an integer of 3 or greater, preferably from 3 to 60, and particularly preferably 6 or 12.

Compound (1) has one aldehyde group or ketone group. Moreover, compound (1) has m−1 hydroxy groups.

Compound (1) is preferably a monosaccharide, specific examples thereof include monosaccharides having an aldehyde group, such as glycerone, erythrose, threose, ribose, lixose, xylose, arabinose, aldohexose, allose, talose, gulose, glucose, altrose, mannose, galactose, idose, and octose, and monosaccharides having a ketone group, such as ketotriose, dihydroxyacetone, ketotetrose, erythrulose, ketopentose, xylulose, ribulose, ketohexose, psicose, fructose, sorbose, and tagatose.

Compound (1) may be an optically active isomer such as a D-form and an L-form or alternatively may be an optically inactive such as a DL form.

In particular, hexoses, such as allose, talose, gulose, glucose, altrose, mannose, galactose, idose, psicose, fructose, sorbose, and tagatose, are preferred as compound (1), and glucose is particularly preferred.

Alkoxy forms are compounds each derived from compound (1) by replacing the hydrogen atom of at least one hydroxy group contained therein by an alkyl group. Such alkoxy groups are preferably ones having at least one hydroxy group. Particularly preferred is an alkoxy form derived from compound (1) by replacing the hydrogen atom of one hydroxy group contained therein by an alkyl group with the other hydroxy groups remaining unreplaced.

The number of the carbon atom(s) of the alkyl group is from 1 to 12, preferably 1 or 2, and particularly preferably 1.

Examples of preferred alkoxy forms include compounds represented by formula (1-2):

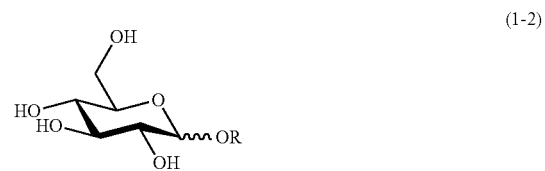

wherein R represents an alkyl group having from 1 to 12 carbon atoms, preferably from 5 to 12 carbon atoms.

Examples of the compounds represented by formula (1-2) include methyl α-D-glucopyranoside, methyl β-D-glucopyranoside, ethyl α-D-glucopyranoside, ethyl β-D-glucopyranoside, n-propyl α-D-glucopyranoside, n-propyl β-D-glucopyranoside, n-butyl α-D-glucopyranoside, n-butyl β-D-glucopyranoside, n-pentyl α-D-glucopyranoside, n-pentyl β-D-glucopyranoside, n-hexyl α-D-glucopyranoside, n-hexyl β-D-glucopyranoside, n-heptyl α-D-glucopyranoside, n-heptyl β-D-glucopyranoside, n-octyl α-D-glucopyranoside, n-octyl β-D-glucopyranoside, n-nonyl α-D-glucopyranoside, n-nonyl β-D-glucopyranoside, n-decyl α-D-glucopyranoside, n-decyl β-D-glucopyranoside, n-undecyl α-D-glucopyranoside, n-undecyl β-D-glucopyranoside, n-dodecyl α-D-glucopyranoside, and n-dodecyl β-D-glucopyranoside.

Examples of the method for producing an alkoxy form include a method involving passing hydrogen chloride gas through an alcohol solution of compound (1) at a temperature of from −10° C. to room temperature in accordance with the disclosure of "Shin Jikken Kagaku Koza (New Lectures of Experimental Chemistry), Vol. 14, Synthesis and Reaction of Organic Compounds V", p. 2426 (1978, Maruzen Co., Ltd.), specifically, a method that involves performing alkoxylation by refluxing a mixed solution of compound (1), alkyl alcohol, and hydrochloric acid by heating.

Methyl α-D-glucopyranoside, n-octyl β-D-glucopyranoside, etc. are available from Tokyo Chemical Industry Co., Ltd.

As to a compound represented by the following formula (2), which may hereinafter be referred to as compound (2), p in formula (2) represents an integer of 2 or greater and is preferably from 2 to 6, and particularly preferably represents 5.

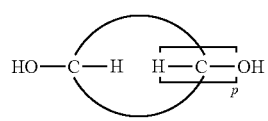

(2)

Examples of compound (2) include 1,2,3-trihydroxycyclopropane, 1,2,3,4-tetrahydroxycyclopentane, 1,2,3,4,5-pentahydroxycyclopentane, 1,2,3,4,5,6-hexahydroxycyclohexane, 1,2,3,4,5,6,7-heptahydroxycycloheptane, and 1,2,3,4,5,6,7,8-octahydroxycyclooctane.

1,2,3,4,5,6-Hexahydroxycyclohexanes, such as myo-inositol, epi-inositol, allo-inositol, muco-inositol, neo-inositol, chiro-inositol, and scyllo-inositol, are preferred, and particularly myo-inositol and scyllo-inositol, which are represented by the following formula, are preferred.

The content of the at least one compound (F) selected from compound group S is from 0.01 parts by mass to 1 part by mass, preferably from 0.05 parts by mass to 0.5 parts by mass relative to 100 parts by mass of the thermoplastic resin (A), carbon fibers (B), and graphite particles (C) in total.

<Organic Fibers (G)>

The resin composition to be used in the present invention may contain organic fibers (G). Examples of the organic fiber (G) include polyester fiber, polyamide fiber, polyurethane fiber, polyimide fiber, polyolefin fiber, polyacrylonitrile fiber, and vegetable fiber, such as kenaf. In particular, when the thermoplastic resin (A) is polyolefin, it is preferred that the resin composition contain organic fibers and use of polyester fiber is preferred.

In the present invention, the organic fiber (G) is preferably used in the form of an organic fiber-containing resin composition in which the above-described thermoplastic resin (A) or a resin such as a modified polyolefin modified with an unsaturated carboxylic acid or a derivative and elastomer has been mixed. Examples of the method for producing an organic fiber-containing resin composition include the methods disclosed in JP 2006-8995 A or JP 3-121146 A.

The content of the organic fibers (G) in the organic fiber-containing resin composition is preferably from 10% by mass to 60% by mass. When an organic fiber-containing resin composition is produced using the thermoplastic resin according to the present invention or a modified polyolefin, the amount used thereof is incorporated into the content of the thermoplastic resin according to the present invention (from 40% by mass to 65% by mass).

The content of the organic fibers (G) as an optional component in the resin composition in the present invention is preferably from 3 parts by mass to 10 parts by mass and preferably from 3 parts by mass to 5 parts by mass relative to 100 parts by mass of the thermoplastic resin (A), the carbon fibers (B) and the graphite particles (C) in total.

<Modifier>

The resin composition to be used in the present invention may contain modifiers such as those described below. Examples of such modifiers include modified polyolefin modified with an unsaturated carboxylic acid or a derivative thereof, which is generally used for strengthen bonding between the thermoplastic resin (A) and an inorganic component. Other examples include glass fiber, talc, wollastonite, and glass flake. In order to improve the processing characteristics, mechanical characteristics, electrical characteristics, thermal characteristics, surface characteristics, and stability to light, additives other than the aforementioned (D), (E), (F) and (G) may be incorporated. Examples of such additives include neutralizers, plasticizers, lubricants, release agents, antibonding agents, nucleating agents, light stabilizers, flame retardants, pigments, and dyes.

<Method for Producing a Resin Composition>

The method for producing of a resin composition is not particularly restricted, and one example thereof is a method in which a thermoplastic resin (A), carbon fibers (B), graphite particles (C), absorbent (D), antioxidant (E), and the compound (F) and the organic fibers (G) to be used according to need, a filler/additive (G), and so on are mixed uniformly using a Henschel mixer, a tumbler, or the like and then melt kneaded by using a plasticizing machine. In the melt kneading, it is preferred to adjust the temperature and agitation speed of the plasticizing machine appropriately for inhibiting the carbon fibers (B) from breaking to become too short.

Especially when adding organic fibers, it is also permitted to prepare a resin composition containing organic fibers beforehand by, for example, the method disclosed in JP 2006-8995 A, then uniformly mix the resin composition with a thermoplastic resin, carbon fibers, a modified polyolefin, and a modifier to be used according to need by using a Henschel mixer, a tumbler, or the like, and then conduct melt kneading using a plasticizing machine.

In conducting melt kneading by using a plasticizing machine, it is also permitted to feed the above-mentioned respective components through the same feed port or separate feed ports and further feed a rubber, such as a polyolefin-based elastomer, a polyester-based elastomer, a polyurethane-based elastomer, and a PVC-based elastomer, and so on, thereby making a resin composition contain them. The plasticizing machine as used herein is a device by which a thermoplastic resin is heated to a temperature equal to or higher than the melting point thereof and apply agitation to the thermoplastic resin being in a molten state. Examples thereof include a Banbury mixer, a single screw extruder, a twin screw co-rotating extruder (e.g., TEM [registered trademark] manufactured by Toshiba Machine Co., Ltd., TEX [registered trademark] manufactured by Japan Steel Works, Ltd.), and a twin screw counter-rotating extruder (e.g., FCM [registered trademark] manufactured by Kobe Steel, Ltd. and CMP [registered trademark] manufactured by The Japan Steel Works, Ltd.).

[Lighting Fixture Components]

The lighting fixture component according to the present invention is obtained by molding the above-described resin composition. The molding method is not particularly restricted and molding can be conducted by using a technique, for example, extrusion molding, injection molding, compression molding, or blow molding.

Examples of the lighting fixture component include heat radiating parts such as a heat sink, ceiling covers, and lampshades.

EXAMPLES

The present invention is illustrated below with reference to examples, but the invention is not limited to the examples.

[Raw Material Components of Resin Compositions]

(1) Resin Composition

The following components were used for resin compositions.

Thermoplastic Resin (a):

(A-1): Propylene-ethylene block copolymer that is obtained by homopolymerizing propylene and then randomly copolymerizing ethylene and propylene (melt flow rate (MFR): 5 g/10 minutes, isotactic pentad fraction of a propylene homopolymer portion=0.98, the content of a propylene-ethylene random copolymer portion in a propylene-ethylene block copolymer: 12% by mass)

(A-2): Propylene homopolymer (MFR: 50 g/10 minutes, isotactic pentad fraction=0.98)

The content (X) of the propylene-ethylene random copolymer portion in the propylene-ethylene block copolymer was determined by measuring the heat of crystal fusion of the propylene homopolymer portion and that of the whole portion of the propylene-ethylene block copolymer and then calculating the content by using the following formula. The heat of crystal fusion was measured by differential scanning calorimetry (DSC).

$$X=1-(\Delta Hf)T/(\Delta Hf)P$$

$(\Delta Hf)T$: heat of fusion (cal/g) of the block copolymer
$(\Delta Hf)P$: Heat of fusion (cal/g) of the propylene homopolymer portion Carbon Fiber (B):

DIALEAD (registered trademark) K223HE produced by Mitsubishi Plastics, Inc.; the number average fiber length=6 mm, the diameter=11 μm, the heat conductivity=550 W/mK Graphite Particle (C):

CB-150 (registered trademark) produced by Nippon Graphite Industries, Co., Ltd., fixed carbon amount>98%, average particle diameter=40 μm Absorbent (D):

(D-1): Calcium hydroxide, produced by Suzuki Kogyo Co. Ltd., commercial name "Calteck LT," average particle diameter=1.5 μm (D-2): Hydrotalcite, produced by Kyowa Chemical Industry Co., Ltd., commercial name: DHT-4C Antioxidant (E):

The following additives were added in the amounts given in Table 1 relative to 100 parts by mass of the thermoplastic resin (A), carbon fibers (B), and graphite particles (C) in total.

(E-1): Commercial name: SUMILIZER GP (produced by Sumitomo Chemical Co., Ltd.); Chemical name: 2,4,8,10-tetra-tert-butyl-6-[3-(3-methyl-4-hydroxy-5-tert-butylphenyl)propoxy]dibenzo[d,f][1,3,2]dioxaphosphepin (E-2): Commercial name IRGANOX 1010 (produced by GE Specialty Chemicals); Chemical name: tetrakis[methylene-3(3',5'-di-tert-butyl-4-hydroxyphenyl) propionate]methane (E-3): Commercial name: IRGAFOS 168 (produced by GE Specialty Chemicals); Chemical name: tris(2,4-di-tert-butylphenyl)phosphite (E-4): Commercial name: SUMILIZER GM (produced by Sumitomo Chemical Co., Ltd.); Chemical name: 2-tert-butyl-6-(3-tert-butyl-2-hydroxy-5-methylbenzyl)-4-methylphenyl acrylate (E-5): Commercial name: SUMILIZER GS (produced by Sumitomo Chemical Co., Ltd.); Chemical name: 2-[1-(2-hydroxy-3,5-di-tert-pentylphenyl)ethyl]-4,6-di-tert-pentylphenyl acrylate Compound (F) selected from compound group S:

D(+)-Trehalose dihydrate (produced by Tokyo Chemical Industry Co., Ltd.)

Modifier:

There was used maleic anhydride-modified polypropylene (MFR=70 g/10 minutes, grafted maleic anhydride amount=0.6% by mass) in the amount given in Table 1 relative to 100 parts by mass of the thermoplastic resin (A), carbon fibers (B), and graphite particles (C) in total.

The maleic anhydride-modified polypropylene was prepared in accordance with the method disclosed in Example 1 of JP 2004-197068 A. As the content of the monomer units derived from an unsaturated carboxylic acid and/or an unsaturated carboxylic acid derivative, used was a value calculated based on a measurement of the absorption based on the unsaturated carboxylic acid and/or the unsaturated carboxylic acid derivative by an infrared absorption spectrum or an NMR spectrum.

[Evaluation of Physical Properties]

Evaluation items of the molded articles produced in examples and comparative examples and the measuring methods thereof are as follows.

(1) Anti-Fogging Property

The anti-fogging property was evaluated by using a gloss retention specimens (4 mm in thickness) prepared in Examples and Comparative Examples and on the basis of the surface condition of glass after a fogging test.

A fogging test was carried out by a method defined by a preset temperature of 140° C. and a glass cooling temperature of 25° C. and involving heating a sample for 20 hours in accordance the provision of ISO 6452. The glass surface after the 20-hour heating was observed visually.

(2) Melt Flow Rate (MFR, Unit: g/10 min)

The melt flow rate of a resin composition for use for the production of samples was measured in accordance with the method provided in JIS K7210. The measurement was performed at a temperature of 230° C. under a load of 2.16 kg.

(3) Specific Gravity

The specific gravity of a sample was measured in accordance with ASTM D792.

(4) Heat Conductivity

The heat conductivity of a molded article was measured using a laser flash method.

Three specimens sized 80 mm×10 mm×4 mm in thickness, each set having been prepared in each of Examples and Comparative Examples, were stacked and bonded, whereby a 12-mm thick laminate was obtained. At two sites in an approximately central part of the laminate, the laminate was cut in the direction perpendicular to the bonded surfaces and each cut section was polished, whereby a specimen sized 10 mm×12 mm×1 mm in thickness was prepared.

Using this specimen, the heat conductivity of the molded article in the in-plane direction (the direction perpendicular to the bonded surface) was measured by using a perpendicular direction to an adhering side) using this specimen with a laser flash thermal constants analyzer (TC-7000 manufactured by ULVAC Technologies, Inc.).

(5) Flexural Modulus (FM, Unit: MPa)

Using the specimens (4 mm in thickness) produced in examples and comparative examples, evaluation was conducted at a span length of 100 mm, a width of 10 mm, a loading speed of 2.0 mm/min, 23° C. in accordance with the method provided in JIS K7171.

(6) Izod Impact Strength (Izod, unit: kJ/cm2)

Using the specimens (4 mm in thickness) produced in examples and comparative examples, the specimen was notched after the molding in accordance with the method provided in JIS K7110, and the notched impact strength was evaluated. The measuring temperature was 23° C.

Example 1

The respective components were put into a polyethylene bag in the proportions given in Table 1, mixed uniformly by shaking vigorously, and then melt kneaded at a cylinder temperature of 240° C. by using a 20-mm single screw extruder VS20-26 manufactured by Tanabe Plastics Machinery Co., Ltd., followed by cutting into a pellet form of about 3 mm in length, whereby a resin composition was produced.

Subsequently, the resulting pellets were subjected to injection molding at a cylinder temperature of 230° C., a mold temperature of 50° C., an injection speed of 20 mm/second, and a holding pressure of 25 MPa by using an injection molding machine (TOYOSI-30III, manufactured by Toyo Seiki Seisaku-sho, Ltd.), so that specimens for evaluation of anti-fogging property, heat conductivity, flexural modulus and Izod impact strength were obtained. The evaluation results of physical properties of the specimens are given in Table 2.

Example 2

Specimens were obtained and physical properties were evaluated in the same procedures as those of Example 1 except for replacing the thermoplastic resin (A-1) with (A-2). The evaluation results of the physical properties of the specimens are given in Table 2.

Example 3

Specimens were obtained and physical properties were evaluated in the same procedures as those of Example 2 except for changing the amounts of the thermoplastic resin (A-2), the carbon fibers (B) and the antioxidant (E) used in Example 2 as shown in Table 1. The evaluation results of the physical properties of the specimens are given in Table 2.

Example 4

Specimens were obtained and physical properties were evaluated in the same procedures as those of Example 3 except for changing the antioxidant (E) used in Example 3 as shown in Table 1. The evaluation results of the physical properties of the specimens are given in Table 2.

Example 5

Specimens were obtained and physical properties were evaluated in the same procedures as those of Example 4 except for changing the antioxidant (E) used in Example 4 as shown in Table 1. The evaluation results of the physical properties of the specimens are given in Table 2.

Comparative Example 1

Specimens were obtained and physical properties were evaluated in the same procedures as those of Example 1 except for replacing the absorbent with (D-2) and further adding a modifier with the added amounts of the respective components as given in Table 1. The evaluation results of physical properties of the specimens are given in Table 2.

TABLE 1

|  |  | Example | | | | | Comparative Example |
|---|---|---|---|---|---|---|---|
|  |  | 1 | 2 | 3 | 4 | 5 | 1 |
| Thermoplastic resin (A) | Kind | A-1 | A-2 | A-2 | A-2 | A-2 | A-1 |
|  | Mass % | 49 | 49 | 46 | 46 | 46 | 46.5 |
| Carbon fibers (B) | Kind | B | B | B | B | B | B |
|  | Mass % | 6 | 6 | 9 | 9 | 9 | 8 |
| Graphite particles (C) | Kind | C-1 | C-1 | C-1 | C-1 | C-1 | C-1 |
|  | Mass % | 45 | 45 | 45 | 45 | 45 | 45.5 |
| Absorbent (D) | Kind | D-1 | D-1 | D-1 | D-1 | D-1 | D-2 |
|  | Mass % | 0.1 | 0.1 | 0.1 | 0.1 | 0.1 | 0.1 |
| Antioxidant (E) | E-1 | 0.2 | 0.2 | — | 0.2 | 0.2 | 0.1 |
|  | E-2 | 0.2 | 0.2 | — | — | — | 0.1 |
|  | E-3 | — | — | 0.2 | — | — | — |
|  | E-4 | — | — | 0.2 | 0.2 | — | — |
|  | E-5 | — | — | — | — | 0.2 | — |
| Modifier |  | — | — | — | — | — | 1 |

TABLE 2

|  | Surface observation | Specific gravity | Heat conductivity W/mK | MFR g/10 minutes | FM MPa | Izod kJ/m² |
|---|---|---|---|---|---|---|
| Example 1 | ○ | 1.30 | 11 | 2.7 | 4390 | 2.1 |
| Example 2 | ○ | 1.30 | 11 | 4.3 | 7620 | 1.3 |
| Example 3 | ○ | 1.33 | 12 | 3.1 | 7710 | 1.2 |
| Example 4 | ○ | 1.33 | 12 | 2.8 | 7410 | 1.2 |
| Example 5 | ○ | 1.34 | 12 | 2.5 | 7370 | 1.2 |
| Comparative Example 1 | X | 1.32 | 11 | 4.6 | 4900 | 1.8 |

In Table 2, a case where the whole surface of glass was fogged uniformly is expressed by ○ and a case where glass was wet is expressed by x. When glass is wet, there is much deposit, which is undesirable.

Example 6

The respective components were put into a polyethylene bag in the proportions given in Table 3, mixed uniformly by shaking vigorously, and then melt kneaded at a cylinder temperature of 240° C. by using a 20-mm single screw extruder VS20-26 manufactured by Tanabe Plastics Machinery Co., Ltd., followed by cutting into a pellet form of about 3 mm in length, whereby a resin composition was produced.

Subsequently, the resulting pellets were subjected to injection molding at a cylinder temperature of 230° C., a mold temperature of 50° C., an injection speed of 20 mm/second, and a holding pressure of 25 MPa by using an injection molding machine (TOYO SI-30III, manufactured by Toyo Seiki Seisaku-sho, Ltd.), so that specimens for evaluation of anti-fogging property, heat conductivity and flexural modulus, and Izod impact strength were obtained. The evaluation results of the physical properties of this specimen are given in Table 4.

Example 7

Specimens were obtained and physical properties were evaluated in the same procedures as those of Example 6 except for changing the antioxidant (E) used in Example 6 as shown in Table 3. The evaluation results of the physical properties of this specimen are given in Table 4.

Comparative Example 2

Specimens were obtained and physical properties were evaluated in the same procedures as those of Example 6 except for replacing the thermoplastic resin (A-1) with (A-2), the absorbent with (S-2), and further adding a modifier with the added amounts of the respective components as given in Table 3. The evaluation results of the physical properties of this specimen are given in Table 4.

Comparative Example 3

Specimens were obtained and physical properties were evaluated in the same procedures as those of Example 7 except for changing the amount of the absorbent (D) used in Example 7 as shown in Table 3. The evaluation results of the physical properties of this specimen are given in Table 4.

Comparative Example 4

Specimens were obtained and physical properties were evaluated in the same procedures as those of Example 7 except for changing the amounts of the absorbent (D), the antioxidant (E) and the compound (F) used in Example 7 as shown in Table 3. The evaluation results of the physical properties of this specimen are given in Table 4.

TABLE 3

| | | Example | | Comparative Example | | |
|---|---|---|---|---|---|---|
| | | 6 | 7 | 2 | 3 | 4 |
| Thermoplastic resin (A) | Kind | A-2 | A-2 | A-1 | A-2 | A-2 |
| | Mass % | 46 | 46 | 46.5 | 46 | 46 |
| Carbon fibers (B) | Kind | B | B | B | B | B |
| | Mass % | 9 | 9 | 8 | 9 | 9 |
| Graphite particles (C) | Kind | C-1 | C-1 | C-1 | C-1 | C-1 |
| | Mass % | 45 | 45 | 45.5 | 45 | 45 |
| Absorbent (D) | Kind | D-1 | D-1 | D-2 | — | D-1 |
| | Mass % | 0.1 | 0.1 | 0.1 | — | 0.05 |
| Antioxidant (E) | E-1 | — | — | 0.1 | — | — |
| | E-2 | — | — | 0.1 | — | — |
| | E-3 | — | — | — | — | — |
| | E-4 | 0.2 | — | — | — | — |
| | E-5 | — | 0.2 | — | 0.2 | 0.1 |
| Compound (F) | | 0.2 | 0.2 | — | 0.2 | 0.1 |
| Modifier | | — | — | 1 | — | — |

TABLE 4

| | Surface observation | Specific gravity | Heat conductivity W/mK | MFR g/10 minutes | FM MPa | Izod kJ/m² |
|---|---|---|---|---|---|---|
| Example 6 | ○ | 1.33 | 12 | 2.6 | 4990 | 1.2 |
| Example 7 | ○ | 1.33 | 12 | 3.2 | 8160 | 1.2 |
| Comparative Example 2 | XX | 1.32 | 11 | 4.6 | 4900 | 1.8 |
| Comparative Example 3 | XX | 1.33 | 12 | 3.0 | 7350 | 1.1 |
| Comparative Example 4 | X | 1.33 | 12 | 3.5 | 7980 | 1.3 |

In Table 4, a case where there was almost no deposit on the whole surface of glass is expressed by ○; a case where the whole surface of glass was fogged is expressed by x; and a case where the glass surface was wet is expressed by xx.

What is claimed is:

1. A resin composition comprising from 40% by mass to 65% by mass of a thermoplastic resin (A), from 5% by mass to 10% by mass of carbon fibers (B) having a heat conductivity exceeding 100 W/mK, and from 30% by mass to 50% by mass of graphite particles (C), wherein the total amount of the thermoplastic resin (A), the carbon fibers (B), and the graphite particles (C) is 100% by mass, and wherein the sum total of the masses of the thermoplastic resin (A), the carbon fibers (B), and the graphite particles (C) is defined to be 100 parts by mass, the composition further comprising, relative to 100 parts by mass:

more than 0.05 parts by mass and not more than 1 part by mass of an absorbent (D) selected from the group consisting of calcium hydroxide, zeolite, and hydrotalcite, and a combination of from 0.05 parts by mass to 1 part by mass of an antioxidant (E) and from 0.01 parts by mass to 1 part by mass of at least one compound (F) selected from the following compound group S:

compound group S: a group consisting of compounds represented by a formula:

$C_nH_{n+2}(OH)_n$, wherein n represents an integer of 4 or greater, alkoxy forms defined below, compounds represented by the following formula (2), trehalose, sucrose, lactose, maltose, melicitose, stachyose, curdlan, glycogen, glucose, and fructose;

wherein the alkoxy forms are compounds each derived from a compound of the following formula (1) by replacing the hydrogen atom of at least one hydroxy group selected from among the hydroxy groups of the compound by an alkyl group having from 1 to 12 carbon atoms:

$$C_mH_{2m}O_m \qquad (1)$$

wherein m is an integer of 3 or greater and the compound of formula (1) has one aldehyde group or ketone group and m−1 hydroxyl groups;

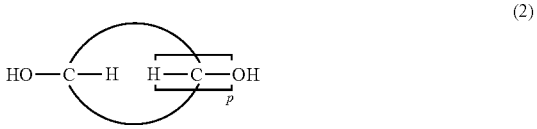

(2)

wherein p is an integer of 2 or greater.

2. The resin composition according to claim 1, wherein the melt flow rates of the thermoplastic resin (A) is from 0.5 g/10 minutes to 30 g/10 minutes.

3. The resin composition according to claim 1, wherein the average particle diameter of the graphite particles (C) is larger than 12 μm and up to 50 μm.

4. A lighting fixture component made of the resin composition according to claim 1.

5. The resin composition according to claim 2, wherein the average particle diameter of the graphite particles (C) is larger than 12 μm and up to 50 μm.

6. A lighting fixture component made of the resin composition according to claim 2.

7. A lighting fixture component made of the resin composition according to claim 3.

* * * * *